United States Patent [19]

Chaintron

[11] 3,716,584
[45] Feb. 13, 1973

[54] PROCESS FOR THE PURIFICATION OF LACTIC ACID

[75] Inventor: Gerard Chaintron, Rhone, France

[73] Assignee: Rhone-Poulenc S.A., Paris, France

[22] Filed: May 21, 1970

[21] Appl. No.: 39,567

[30] Foreign Application Priority Data

May 23, 1969 France.................................6916915

[52] U.S. Cl. .............................................260/535 R
[51] Int. Cl. ..............................................C07c 59/08
[58] Field of Search.........................................260/535

[56] References Cited

UNITED STATES PATENTS 924,494   6/1909   Noerdlinger et al..................260/535

FOREIGN PATENTS OR APPLICATIONS 907,322   10/1962   Great Britain....................260/535 R

*Primary Examiner*—Lorraine A. Weinberger
*Assistant Examiner*—Paul J. Killos
*Attorney*—Stevens, Davis, Miller & Mosher

[57] ABSTRACT

This invention provides a process for purifying lactic acid obtained by hydrolysis of the intermediate products produced by the oxidation of propylene with nitric acid and/or nitrogen peroxide, with removal of some, at least, of the nitric acid, by treating the lactic acid with hydrogen in the presence of a hydrogenation catalyst.

7 Claims, No Drawings

PROCESS FOR THE PURIFICATION OF LACTIC ACID

This invention relates to a process for the purification of the lactic acid which has been obtained by hydrolysis of the intermediate products produced by the oxidation of propylene by nitric acid and/or nitrogen peroxide, with removal of at least a part of the nitric acid.

In French Patent 1,465,640 and its Additions Nos. 90,556 and 92,116, as well as in French Patent 1,500,619 there is described a process in which lactic acid is prepared by the oxidation of propylene by nitric acid and/or nitrogen peroxide, optionally in the presence of oxygen, to give intermediate compounds consisting principally of α-nitratopropionic acid, which are thereafter subjected to hydrolysis by water, where appropriate in the presence of an acid such as nitric acid. During the reaction, nitric acid is liberated and at the end of the reaction an aqueous solution of lactic acid containing nitric acid is obtained. These two acids can be separated by various processes, for example by treatment with tertiary or secondary amines, or, more conveniently, by the azeotropic distillation of the nitric acid (French Patent 1,500,619) or by extraction of the lactic acid with butanol (Netherlands Application 67.16490). These preliminary separation techniques lead to a lactic acid which, even if it does not contain nitric acid, still contains nitrogenous impurities of an undetermined nature.

It has now been found, according to the present invention, that such impurities can be removed by treatment with hydrogen in the presence of a hydrogenation catalyst. Accordingly, the present invention provides a process for the purification of lactic acid which has been obtained by hydrolysis of the intermediate products produced by the oxidation of propylene by nitric acid and/or nitrogen peroxide, with removal of at least a part of the nitric acid, which comprises treating the lactic acid with hydrogen in the presence of a hydrogenation catalyst. The preferred hydrogenation catalysts are metals of group VIII of the Periodic Table, more particularly the noble metals such as ruthenium, palladium, rhodium and platinum. These metals can be used by themselves in the form of a powder of varying particle size or in the form of spheres or granules. They can also be deposited on the carriers usually employed for such catalysts (c.f. S. BERKMAN et al. Catalysis, pgs. 426 to 510), such as inactivated or activated animal or vegetable charcoals, simple or complex silicates, silica, alumina and the aluminates, asbestos, pumice, quartz, kaolin, coke, bauxite, diatomaceous earth and sand. It is also possible to use mixture of silica and alumina or aluminosilicates. The metal content of the carrier is not critical.

The amount of metal used should generally be greater than 0.001 percent by weight based on the weight of the lactic acid subjected to the treatment and can range up to 5 percent. Amounts above 5 percent can be used but no special advantages are obtained thereby. In practice amounts of metal of from 0.05 to 0.5 percent suffice.

The temperature of treatment of the lactic acid can generally vary from 20° to 250°C. and, preferably, from 50° to 180°C. The treatment can be carried out at normal pressure or under higher pressures, for example 200 bars. In practice pressures of from five to 100 bars are generally suitable.

In order to carry out the process of this invention, a stream of hydrogen can be passed into the lactic acid, which may either be anhydrous or in aqueous solution containing the catalyst. It is also possible to trickle the lactic acid into a column containing a packing and the catalyst, with a stream of hydrogen being introduced into the column in co- or counter-current to the flow of the lactic acid.

The process according to the invention is particularly advantageous because practically all the nitrogen-containing impurities are destroyed, with nitrogen being removed as a gas (for example as $N_2$ or $N_2O$). Sometimes part of the nitrogen (of varying magnitude depending on the treatment conditions) is converted into ammonium ions which remain dissolved in the lactic acid. A supplementary treatment by cation exchange resins or by electrodialysis makes it possible to remove this residual nitrogen.

The process according to this invention makes it possible to obtain, in a simple manner, a lactic acid of very high purity such that it contains less than 0.15 percent of nitrogen in the form of ammonium ions; it is therefore particularly suitable for foodstuff and pharmaceutical uses.

The following examples further illustrate the present invention.

EXAMPLE 1

300 g. of lactic acid, free of nitric acid and containing 0.34 percent by weight of nitrogen determined by the method of DEWARDA, and 6 g. of a palladium catalyst on carbon black, containing 10 percent of metal, were introduced into a 500 cc. stainless steel autoclave equipped with a shaking device. The autoclave was closed, flushed with hydrogen, and a hydrogen pressure of 50 bars then established after having heated the contents of the autoclave to 120°C. After 5 minutes the pressure dropped to 40 bars. Hydrogen was injected so as to bring the pressure up to 50 bars; after 5 minutes, the pressure settled at 40 bars. These conditions were maintained for 20 minutes and then the contents of the autoclave cooled to 20°C. and the apparatus degassed. The catalyst was filtered off; the resulting lactic acid contained only 0.04 percent by weight of nitrogen in the form of ammonium ions; this was completely removed by passing the lactic acid, to which 300 g. of water had been added, over a cation exchange resin known under the trademark "AMBERLITE-120."

The catalyst used during the hydrogenation was prepared by impregnating carbon black successively with a normal sodium bicarbonate solution and then with a palladous chloride solution in hydrochloric acid, followed by reduction with formaldehyde.

The lactic acid used was obtained by hydrolyzing the product of the oxidation of propylene by nitric acid and removing the oxygen-containing compounds of nitrogen of valency 2 to 4 formed during the hydrolysis at the rate at which they are formed (following the procedure of Addition No. 92,116 to French Patent 1,465,460). The lactic acid was isolated from the resulting solution by distillation.

EXAMPLES 2 to 4

Various tests were carried out as in Example 1 but increasing the hydrogen pressure to 50 bars, and adding water to the lactic acid (Examples 3 and 4). In all cases the duration of the treatment was 30 minutes. The results obtained are given in the Table below:

| Example | Water content of the lactic acid | Residual nitrogen in the form of ammonium ion | total nitrogen |
|---------|----------------------------------|-----------------------------------------------|----------------|
| 2 | 0 % | 0.04 % | 0.04% |
| 3 | 10 % | 0.075 % | 0.075 % |
| 4 | 20 % | 0.12 % | 0.12 % |

EXAMPLE 5

The technique described in Example 1 was followed, but raising the pressure to 50 bars and altering the temperature and duration of the treatment. The results given in the Table below were obtained:

| Example | Temperature | Duration | Residual nitrogen in the form of $NH_4$ ion | total nitrogen |
|---------|-------------|----------|---------------------------------------------|----------------|
| 5 | 75°C | 45 mins. | 0.057 % | 0.057 % |

EXAMPLE 6

The technique of Example 1 was used, but under a hydrogen pressure of 10 bars. After 30 minutes' reaction, the total nitrogen content had been lowered to 0.036 percent, this nitrogen being present in the form of ammonium ions.

EXAMPLE 7

The technique of Example 1 was followed, under the conditions of Example 3, but replacing the palladium by 0.1 percent by weight of platinum (2 g. of catalyst consisting of platinum on carbon black, containing 5 percent of metal). After 30 minutes' reaction, lactic acid containing a total of 0.13 percent of nitrogen was obtained, this nitrogen being present in the form of quaternary ammonium ions.

I claim:

1. In a process for the production of lactic acid which comprises the steps of:
   i. oxidizing propylene with a nitrogen compound selected from the group consisting of nitric acid and nitrogen peroxide;
   ii. hydrolyzing the intermediate product formed in step (i); and
   iii. removing at least a part of the nitric acid from the lactic acid in step (ii);

the improvement which comprises purifying the lactic acid obtained in step (iii) by treating it with hydrogen in the presence of a hydrogenation catalyst which is a metal of Group VIII of the Periodic Table.

2. A process according to claim 1, wherein the catalyst is palladium or platinum.

3. A process according to claim 1, wherein the metal is present in an amount from 0.05 to 0.5 percent by weight, based on the weight of the lactic acid.

4. A process according to claim 1, wherein the treatment with hydrogen is carried out at a temperature of 20° to 250°C. and at a pressure of one to 200 bars.

5. A process according to claim 4, wherein the treatment with hydrogen is carried out at a temperature of 50° to 180°C. and at a pressure of five to 100 bars.

6. A process according to claim 2, wherein the treatment with hydrogen is carried out at a temperature of 20° to 250°C. and at a pressure of one to 200 bars.

7. A process according to claim 6, wherein the treatment with hydrogen is carried out at a temperature of 50° to 180°C. and at a pressure of five to 100 bars.

* * * * *